US011619551B1

(12) United States Patent
Fayneh et al.

(10) Patent No.: US 11,619,551 B1
(45) Date of Patent: Apr. 4, 2023

(54) THERMAL SENSOR FOR INTEGRATED CIRCUIT

(71) Applicant: PROTEANTECS LTD., Haifa (IL)

(72) Inventors: Eyal Fayneh, Givatayim (IL); Guy Redler, Haifa (IL); Shaked Rahamim, Geva Carmel (IL); Evelyn Landman, Haifa (IL)

(73) Assignee: PROTEANTECS LTD., Haifa (IL)

( * ) Notice: Subject to any disclaimer, the term of this patent is extended or adjusted under 35 U.S.C. 154(b) by 0 days.

(21) Appl. No.: 17/750,637

(22) Filed: May 23, 2022

Related U.S. Application Data

(60) Provisional application No. 63/303,674, filed on Jan. 27, 2022.

(51) Int. Cl.
  *G01K 7/00* (2006.01)
  *G01K 7/01* (2006.01)
  *G01K 15/00* (2006.01)

(52) U.S. Cl.
  CPC .......... *G01K 7/015* (2013.01); *G01K 15/005* (2013.01); *G01K 2219/00* (2013.01)

(58) Field of Classification Search
  CPC .. G01K 7/015; G01K 15/005; G01K 2219/00; G01K 7/01; G01K 7/00;
  (Continued)

(56) References Cited

U.S. PATENT DOCUMENTS 5,087,830 A  *  2/1992  Cave ......................... G05F 3/30
                                                      327/539
5,895,629 A     4/1999  Russell et al.
(Continued)

FOREIGN PATENT DOCUMENTS

CN        201589668 U  *  9/2010
CN        102853931 A  *  1/2013  ............... G01K 7/01
(Continued)

OTHER PUBLICATIONS

Eric A. Vittoz, "A low-voltage CMOS Bandgap Reference"; IEEE Journal of Solid State Circuits, vol. SC-14, No. 3, pp. 573-579, Jun. 1979.

*Primary Examiner* — Gail Kaplan Verbitsky
(74) *Attorney, Agent, or Firm* — The Roy Gross Law Firm, LLC; Roy Gross

(57) ABSTRACT

A thermal sensor for an integrated circuit including: a Proportional To Absolute Temperature (PTAT) circuit comprising n-type MOS transistors and providing a first voltage; and a voltage generator circuit comprising a p-type MOS transistor and providing a second voltage. A reference voltage is based on the first voltage and the second voltage. At least one thermal output signal is based on the reference voltage together with the first voltage and/or the second voltage. In another aspect, an integrated circuit has a power routing arrangement, providing a power supply core voltage (VDDcore) to operate functional circuitry on the integrated circuit. One or more local thermal sensors are located on the integrated circuit, each comprising a PTAT circuit having MOS transistors using the power supply core voltage to generate a temperature-dependent voltage that varies independently of power supply core voltage variation.

13 Claims, 8 Drawing Sheets

(58) Field of Classification Search
CPC ......... G01K 13/00; H01L 35/00; H01L 37/00; H03K 17/78; H03K 3/42
USPC .... 374/1, 170, 178, 183, 108; 327/512, 513; 323/313
See application file for complete search history.

(56) References Cited

U.S. PATENT DOCUMENTS

| | | | |
|---|---|---|---|
| 6,271,652 B1 * | 8/2001 | Burstein | G05F 3/30 323/313 |
| 6,882,172 B1 | 4/2005 | Suzuki et al. | |
| 6,948,388 B1 | 9/2005 | Clayton et al. | |
| 7,038,483 B1 | 5/2006 | Suzuki et al. | |
| 7,224,209 B2 * | 5/2007 | Hsu | G05F 3/30 327/542 |
| 7,649,373 B2 | 1/2010 | Tokunaga et al. | |
| 7,726,877 B1 * | 6/2010 | Avitan | G01K 7/015 327/512 |
| 7,880,534 B2 * | 2/2011 | Huang | G05F 3/30 327/512 |
| 9,632,126 B2 | 4/2017 | Yoon et al. | |
| 9,714,966 B2 | 7/2017 | Chen et al. | |
| 2005/0151528 A1 * | 7/2005 | Marinca | G05F 3/30 323/316 |
| 2006/0049886 A1 | 3/2006 | Agostinelli et al. | |
| 2007/0171956 A1 * | 7/2007 | Noguchi | G01K 7/01 374/100 |
| 2008/0042737 A1 * | 2/2008 | Kim | G05F 3/30 327/539 |
| 2009/0096495 A1 | 4/2009 | Keigo et al. | |
| 2010/0007324 A1 * | 1/2010 | Masson | G05F 3/30 323/313 |
| 2010/0253382 A1 | 10/2010 | Wang et al. | |
| 2011/0074495 A1 * | 3/2011 | Duval | G05F 3/30 327/539 |
| 2011/0102091 A1 | 5/2011 | Yeric et al. | |
| 2011/0255568 A1 * | 10/2011 | Swei | G01K 7/01 374/E7.004 |
| 2012/0074973 A1 | 3/2012 | Baldwin et al. | |
| 2012/0139523 A1 * | 6/2012 | Kondo | G05F 3/30 323/313 |
| 2015/0063419 A1 * | 3/2015 | Obayashi | G01K 7/01 327/512 |
| 2015/0226614 A1 * | 8/2015 | Matsumoto | G11C 7/04 374/171 |
| 2015/0227156 A1 * | 8/2015 | Kobayashi | G05F 3/16 323/268 |
| 2016/0126935 A1 * | 5/2016 | Marinca | G05F 3/30 327/513 |
| 2016/0156176 A1 | 6/2016 | Kunz, Jr. et al. | |
| 2016/0164503 A1 | 6/2016 | Kim et al. | |
| 2016/0238464 A1 * | 8/2016 | Eberlein | G01K 15/00 |
| 2017/0038265 A1 | 2/2017 | Abdelmoneum et al. | |
| 2017/0199089 A1 | 7/2017 | Fritchman et al. | |
| 2017/0227409 A1 * | 8/2017 | Wadhwa | G01K 13/00 |
| 2020/0333393 A1 | 10/2020 | Fayneh et al. | |
| 2021/0325261 A1 * | 10/2021 | Hu | G01K 7/425 |

FOREIGN PATENT DOCUMENTS

| | | | |
|---|---|---|---|
| CN | 207515919 U * | 6/2018 | |
| DE | 102015122521 A1 * | 6/2017 | ............. G05F 3/30 |
| GB | 2031193 A * | 4/1980 | ............. G05F 3/20 |
| JP | 2018018561 A * | 2/2018 | ............. G05F 3/30 |
| WO | 2021019539 | 2/2021 | |
| WO | WO-2021227711 A1 * | 11/2021 | ............. G01K 7/00 |

* cited by examiner

THERMAL SENSOR FOR INTEGRATED CIRCUIT

CROSS-REFERENCE TO RELATED APPLICATIONS

This application claims priority to U.S. Provisional Patent Application No. 63/303,674, filed Jan. 27, 2022, and entitled "Local Voltage Thermal Sensor," the contents of which are incorporated herein by reference.

FIELD OF THE INVENTION

The invention relates to the field of thermal sensors for integrated circuits.

BACKGROUND

Integrated circuits (ICs) may include analog and digital electronic circuits on a flat semiconductor substrate, such as a silicon wafer. Microscopic transistors are printed onto the substrate using photolithography techniques to produce complex circuits of billions of transistors in a very small area, making modern electronic circuit design using ICs both low cost and high performance. ICs are produced in assembly lines of factories, termed foundries, which have commoditized the production of ICs, such as complementary metal-oxide-semiconductor (CMOS) ICs. Digital ICs contain billions of transistors, such as metal-oxide-semiconductor field-effect transistor (MOSFETs), arranged in functional and/or logical units on the wafer, with data paths interconnecting the functional units that transfer data values between the functional units. Each unit has a power source and an associated on power, off power, standby power, and the like.

Digital ICs implement a large number of CMOS-based sub-circuits, each sub circuit associated with an OFF configuration. During the OFF configuration, power may still be consumed by the sub-circuit devices, such as often called static-power consumption. The static (or leakage) power of all the sub-circuits within an IC is summed and may be called the total IC static power.

In digital ICs, sub-threshold leakage may be considered a parasitic leakage in a state that would ideally have no current. Conversely, in micropower analog circuits, weak inversion is an efficient operating region, and subthreshold may be a useful transistor mode around which circuit functions may be designed. Measuring or tracking leakage current and other operational characteristics of the functional units or IC, such as temperature, is therefore desirable.

In semiconductor ICs, sensing of local temperature at different locations in the IC is desirable. A temperature sensor may be embedded in the IC for this purpose. The temperature sensor may be used to protect the IC from over-heating conditions. For example, the temperature sensor may cause the IC to shut down if the temperature exceeds a threshold. It is therefore desirable that the temperature sensor be as accurate and reliable as possible. Digital Thermal Sensors (DTSs) are commonly used, typically based on diodes. The power requirements of a DTS are high, and to provide it with electrical power, it is typically connected to the $V_{CC}A$ power supply of the IC package. As a result, dedicated conduction paths are needed in the IC, from the $V_{CC}A$ pins at the periphery of the IC to the DTS. Implementing multiple DTSs in this way therefore becomes complex, expensive, and power-consuming.

PCT International Publication No. WO 2021/019539 A1, commonly assigned with the present application, proposes the use of spaced apart ring oscillator (ROSC) circuits, each having a respective oscillation frequency in operation that varies with temperature. One ROSC circuit is proximate a semiconductor (diode-based) temperature sensor and the oscillation frequency of this ROSC circuit is used to determine a temperature at a distal ROSC circuit. At least one diode-based temperature sensor is nevertheless still required for accuracy.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

In one aspect, there is provided a thermal sensor for an integrated circuit, comprising: a Proportional To Absolute Temperature (PTAT) circuit, comprising two series-connected n-type MOS transistors configured to receive a current source output and to provide a first voltage; a voltage generator circuit, comprising a p-type MOS transistor configured to provide a second voltage; a reference voltage generation circuit, configured to generate a reference voltage based on the first voltage and the second voltage; and an output circuit, configured to generate at least one thermal output signal based on the reference voltage together with the first voltage and/or the second voltage. Optional features relating to this aspect are detailed below and may be provided in any combination.

In embodiments, the reference voltage generation circuit comprises: a first voltage-to-current circuit, configured to convert the first voltage to a first current; and a second voltage-to-current circuit, configured to convert the second voltage to a second current. The reference voltage generation circuit is advantageously configured to generate the reference voltage based on a combination of the first current and the second current.

In embodiments, each of the first and second voltage-to-current circuits comprises: an amplifier circuit, configured to receive an input voltage at a first input and provide an output voltage; and a source follower circuit, comprising a MOS transistor having: a drain coupled to a power supply voltage, a gate configured to receive the output voltage from the amplifier circuit, and a source configured to provide a source voltage, the source being connected to ground via a resistor. Advantageously, the amplifier circuit is configured to receive the source voltage at a second input.

In embodiments, the reference voltage generation circuit further comprises: a first combiner transistor, having: a drain coupled to the power supply voltage, a gate coupled to the gate of the MOS transistor of the first voltage-to-current circuit, and a source coupled to a common point; a second combiner transistor, having: a drain coupled to the power supply voltage, a gate coupled to the gate of the MOS transistor of the second voltage-to-current circuit, and a source coupled to the common point; and a common resistor, connecting the common point to ground, the reference voltage being output at the common point. Optionally, a width of the first combiner transistor is different from a width of the second combiner transistor.

In embodiments, the PTAT circuit further comprises a first p-type current source transistor having: a source connected to a power supply voltage, a gate coupled to the gate of the MOS transistor of the first voltage-to-current circuit, and a drain configured to provide the current source output to the series-connected n-type MOS transistors. Additionally or alternatively, the voltage generator circuit further comprises a second p-type current source transistor, having: a source connected to a power supply voltage, a gate coupled to the gate of the first p-type current source transistor and/or the gate of the MOS transistor of the first voltage-to-current circuit and a drain configured to provide the current source output to the p-type MOS transistor.

In embodiments, the thermal sensor further comprises: a sensed voltage generation circuit, comprising a MOS transistor having: a drain coupled to a power supply voltage, a gate coupled to the gate of the MOS transistor of the first voltage-to-current circuit or to the gate of the MOS transistor of the second voltage-to-current circuit, and a source connected to ground via a selectable resistance, the voltage at the source being provided as an output sensed voltage.

In embodiments, the series-connected n-type MOS transistors of the PTAT circuit comprise: a first n-type MOS transistor having: a source connected to ground, and a drain connected to a common point, and a second n-type MOS transistor having: a source connected to the common point, and a drain connected to a gate of the first n-type MOS transistor and to a gate of the second n-type MOS transistor, wherein the drain of the second n-type MOS transistor is further configured to receive the current source output, and wherein the first voltage is provided at the common point. Additionally or alternatively, the p-type MOS transistor of the voltage generator circuit has a drain and a gate connected to ground, and a source that is configured to receive a current source output and to provide the second voltage.

In embodiments, the at least one thermal output signal comprises a thermal trip signal and the output circuit comprises a thermal trip circuit, configured to generate the thermal trip signal by comparing a threshold voltage with a sensed voltage that is based on the first voltage and/or the second voltage, the threshold voltage being generated from the reference voltage. Optionally, the threshold voltage is generated by applying the reference voltage to a resistive divider, the resistive divider comprising a selectable resistance, to allow selection of the threshold voltage.

In embodiments, the at least one thermal output signal comprises a digital thermal signal and the output circuit comprises an analog-to-digital convertor, configured to convert a sensed voltage based on the first voltage and/or the second voltage to the digital thermal signal, the analog-to-digital convertor using the reference voltage to generate the digital thermal signal. Optionally, the analog-to-digital convertor comprises a sigma-delta modulator.

In embodiments, the thermal sensor further comprises a calibration circuit, comprising: a calibration voltage generation circuit, comprising a resistive divider, a power supply voltage being applied to the resistive divider, wherein a resistance of the resistive divider is selectable to generate a configurable calibration voltage; and a switching circuit. The switching circuit is advantageously configured to apply selectively: in a first configuration, the reference voltage at an analog signal input of the analog-to-digital convertor, and the calibration voltage at a reference input of the analog-to-digital convertor; in a second configuration, the sensed voltage at the analog signal input of the analog-to-digital convertor, and the calibration voltage at the reference input of the analog-to-digital convertor; and in a third configuration, the sensed voltage at the analog signal input of the analog-to-digital convertor, and the reference voltage at the reference input of the analog-to-digital convertor.

In another aspect (which may be combined with any other aspect disclosed herein), there is provided an integrated circuit, comprising: a power routing arrangement, providing a power supply core voltage (VDDcore) to operate functional circuitry on the integrated circuit; and one or more local thermal sensors located on the integrated circuit, each comprising a Proportional-To-Absolute Temperature (PTAT) circuit comprising MOS transistors, configured to use the power supply core voltage to generate at least one temperature-dependent voltage that varies independently of variation in the power supply core voltage.

Features of other aspects may be optionally applied to this aspect. For example, in embodiments, each of the one or more local thermal sensors comprises: a PTAT circuit, configured to use n-type MOS transistors to generate a first temperature-dependent voltage of the at least one temperature-dependent voltage; a voltage generator circuit, configured to use a p-type MOS transistor to generate a second temperature-dependent voltage of the at least one temperature-dependent voltage; and a reference voltage generation circuit, configured to use the first and second temperature-dependent voltages to generate a reference voltage that is independent of variation in temperature and/or the power supply core voltage.

In a further aspect (also combinable with other aspects), there is provided a method of operating a thermal sensor on an integrated circuit, the method comprising: obtaining a first voltage using two series-connected n-type MOS transistors receiving a current source output; obtaining a second voltage using a p-type MOS transistor; using the first voltage and the second voltage to generate a reference voltage; and generating at least one thermal output signal based on the reference voltage together with the first voltage and/or the second voltage. Features of other aspects may be optionally applied to this aspect. Optional features relating to this aspect are detailed below and may be provided in any combination.

In embodiments, the step of using the first voltage and the second voltage to generate a reference voltage comprises: converting the first voltage to a first current using a first MOS transistor arrangement; converting the second voltage to a second current using a second MOS transistor arrangement; and combining the first current and the second current, the reference voltage being generated by the combined first and second current flowing through a resistance. Advantageously, the method further comprises calibrating the reference voltage, by configuring one or more of: the first MOS transistor arrangement; the second MOS transistor arrangement; and the resistance.

In embodiments, the method further comprises: generating a sensed voltage by converting the first voltage or the second voltage to a sensed current using a MOS transistor arrangement, the sensed voltage being generated by the sensed current flowing through a resistance; and calibrating the sensed voltage, by configuring the resistance. Advantageously, the thermal output signal is generated based on the sensed voltage.

In embodiments, the step of generating the at least one thermal output signal comprises applying a sensed voltage based on the first voltage or the second voltage to an analog-to-digital converter to generate a digital thermal signal. Then, the method may further comprise calibrating the thermal output signal by: generating a calibration voltage, by applying a power supply voltage to a resistive divider having a selectable resistance and selecting the resistance according to the power supply voltage; providing the reference voltage at an analog signal input of the analog-to-digital convertor and the calibration voltage at the reference input of the analog-to-digital convertor, and reading the thermal output signal as a first calibration output; providing the sensed voltage at the analog signal input of the analog-to-digital convertor and the calibration voltage at the reference input of the analog-to-digital convertor, and reading the thermal output signal as a second calibration output; and determining a calibration value based on the first and second calibration outputs.

In embodiments, the step of generating the at least one thermal output signal comprises generating a thermal trip signal by comparing a threshold voltage with a sensed voltage that is based on the first voltage and/or the second voltage, the threshold voltage being generated by applying the reference voltage to a resistive divider having a selectable resistance. Then, the method may further comprise: calibrating the thermal trip signal by setting the selectable resistance.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. Where the same features are indicated, identical reference numerals have been used. The figures are listed below.

DETAILED DESCRIPTION

Disclosed herein is a thermal sensor for a semiconductor IC, a semiconductor IC comprising local thermal sensors and a method for operating the same.

Figure 1:
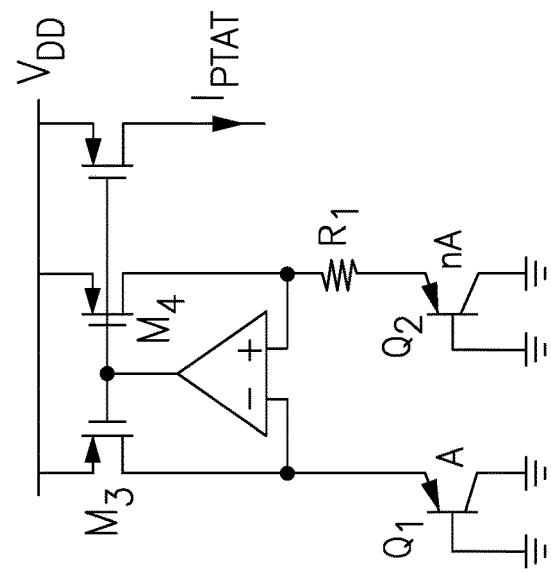
FIG. 1 shows a circuit diagram of an existing diode-based temperature sensor for an IC.

First, however, for comparison, reference is made to FIG. 1, which shows a circuit diagram of an existing, conventional, diode-based temperature sensor for an IC. Two diode arrays are implemented by PNP transistors $Q_1$ and $Q_2$. This uses a specific $V_{DD}$ power supply voltage, which is generated as a multiple of the core power supply voltage, $V_{DD\text{-}CORE}$. The circuit can be used for wide range of core power supply voltage. Calibration is needed to compensate for the diode ideality factor, amplifier offset and random effects. A PTAT current is given by the following expression, in which n represents the size ratio of the transistors, and kT/q indicates the Thermal Voltage ($V_T$) of the diode (PN junction), according to the Shockley diode equation:

$$I_{PTAT}(T) = \Delta VBE/R_1 = \ln(n) \cdot 1/R_1 \cdot k/q \cdot T,$$

where k is the Boltzmann constant, T is temperature, and q is the electron charge.

The rate of change of VBE (Base-Emitter Voltage) with temperature ($\delta VBE/\delta T$) is $-1.286$ mV/°C. Hence, VBE or $I_{PTAT}$ can be used to sense temperature. This is termed remote diode sensing.

An Analog-to-Digital Converter (ADC) is used to digitize the analog current ($I_{PTAT}$) or voltage (VBE or $\Delta VBE$, for instance) into digital readout. A temperature indication, used for comparison with a threshold for identifying a catastrophic condition, can be generated directly from VBE. The threshold may require calibration. The ADC readout is referenced to a temperature independent reference voltage, $V_{REF}$.

Figure 2:
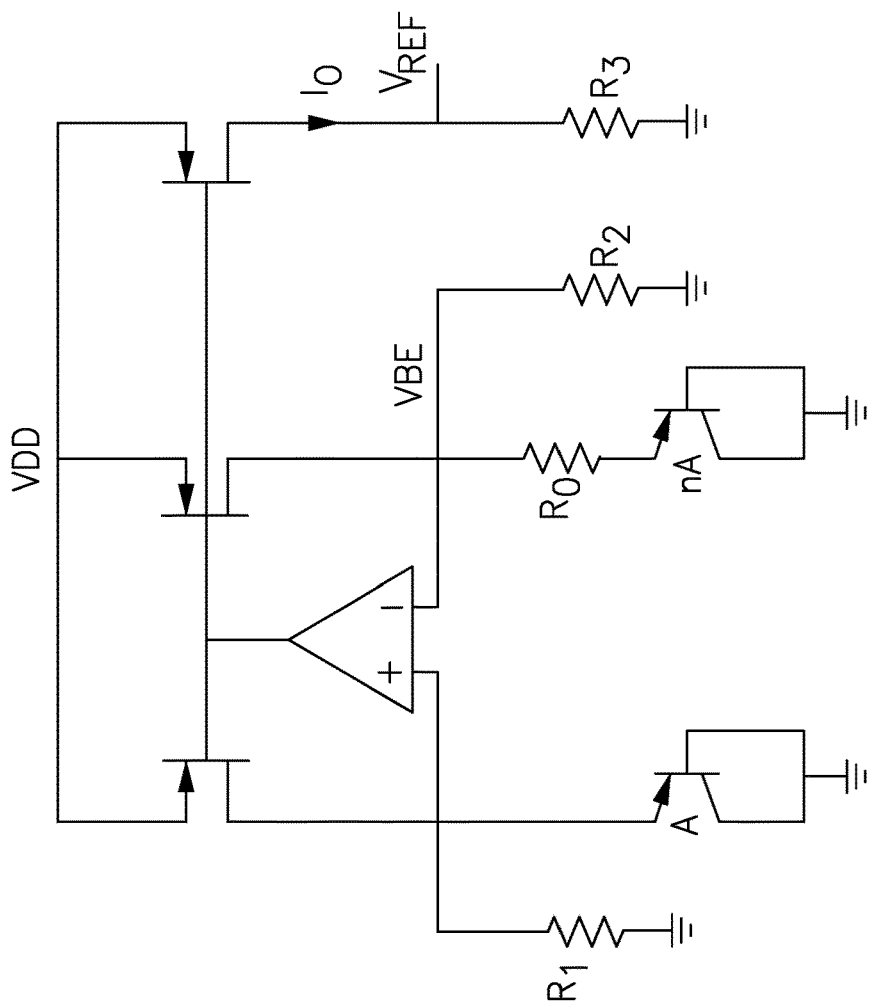
FIG. 2 shows a circuit diagram of an existing diode-based reference voltage generator for an IC.

Referring now to FIG. 2, there is shown a circuit diagram of an existing diode-based reference voltage generator for an IC. The output current, $I_O$, is given by the expression below. The first term ($\Delta VBE/R_0$) increases with increasing temperature, whilst the second term ($VBE/R_1$) decreases with increasing temperature. By careful selection of the resistance values, therefore, $I_O$ and consequently VREF (which is given by $I_O \cdot R_3$) can be made temperature invariant.

$$I_O(T) = \Delta VBE/R_0 + VBE/R_1 = \ln(n) \cdot 1/R_0 \cdot k/q \cdot T + VBE(T)/R_1$$

Remote diode sensing is sensitive to power supply voltage drop in the reference voltage generation and/or distribution. The number of remote diode sensors is typically limited by the ADC input stage leakage current. The accuracy of the sensors without calibration is commonly said to be ±7°C., but with calibration can be as low as ±1°C. The size of the sensors is also large (commonly, 8000 to 30000 μm²).

Disclosed herein, as briefly stated above, is a thermal sensor for a semiconductor IC, a semiconductor IC comprising local thermal sensors and a method for operating the same. The thermal sensor is based on a MOS-based Proportional To Absolute Temperature (PTAT) circuit (NMOS-based) and/or voltage generator (PMOS-based). In addition, the sensor uses a temperature-independent reference voltage (VREF) generator, particularly as a reference voltage for a Sigma-Delta Analog-to Digital Converter (ADC) and/or for generating a threshold voltage for a thermal trip circuit. The PTAT circuit comprises two series-connected NMOS transistors arranged to receive a current source output and provide a temperature dependent voltage that may be converted to a PTAT current. The size of the sensor is therefore small. Multiple local voltage temperature sensors can thus be provided. Advantageously, the thermal sensor output may be independent of power supply voltage variation and may therefore be powered by the core power supply voltage, $V_{DDCORE}$. This makes routing of the power supply more straightforward than with existing diode-based sensors. The power supply advantageously supports a number of power-performance modes, for example: High-Voltage/High-Frequency, Low-Voltage/Low-Frequency. The Thermal Sensor may be used to determine a power-performance mode (voltage/frequency pair) based on the current measured temperature, as the IC temperature changes with time.

Using the PTAT circuit to provide a stable thermal sensor output beneficially uses a reference voltage that is independent of variation in the power supply voltage. This may be provided using two complementary temperature dependent voltage generator circuits: one providing an output signal with a positive correlation to temperature, based on a n-channel MOSFET (NMOS); and the other providing an output signal with a negative correlation to temperature, based on a p-channel MOSFET (PMOS). The output signal for each circuit is typically a current derived from the generated voltage. A stable reference voltage may be generated using the two output signals together.

In a general sense and according to a one aspect, there may be considered an integrated circuit (IC), comprising a power routing arrangement, providing a power supply core voltage (VDDcore) to operate functional circuitry on the integrated circuit. The power supply core voltage is generally used to supply circuitry for producing functional outputs of the IC, for instance CPU/GPU functionality. One or more local thermal sensors are located on the integrated circuit, each comprising a Proportional-To-Absolute Temperature (PTAT) circuit comprising MOS transistors, configured to use the power supply core voltage to generate at least one temperature-dependent voltage that varies independently of variation in the power supply core voltage. The use of a MOS-based PTAT circuit allows local voltage thermal sensors to be provided of small size (in comparison with diode-based sensors), but high accuracy. The at least one temperature-dependent voltage may be used to select an operation mode of power supply circuitry of the IC. This aspect may be combined with any other aspect disclosed herein or implemented as a method, for example as a method of providing, manufacturing and/or operating such an IC.

Advantageously, each of the one or more local thermal sensors comprises: a PTAT circuit, configured to use n-type MOS transistors to generate a first temperature-dependent voltage of the at least one temperature-dependent voltage (the voltage typically having a positive correlation with temperature); a voltage generator circuit, configured to use a p-type MOS transistor to generate a second temperature-dependent voltage of the at least one temperature-dependent voltage (the voltage typically having a negative correlation with temperature); and a reference voltage generation circuit, configured to use the first and second temperature-dependent voltages to generate a reference voltage that is independent of variation in temperature and/or the power supply core voltage. By matching the magnitude of correlation for the first voltage with temperature to the magnitude of correlation for the second voltage with temperature (the two correlations having opposite signs), the reference voltage may be independent of temperature variation. The first voltage is also beneficially independent of the power supply core voltage. By adjustment of the second voltage generation, the reference voltage may also be set so as to be independent of power supply core voltage variation (that is, a high Power Supply Rejection Ratio, PSRR).

Also in a general sense and according to another aspect, there is provided a thermal sensor for an integrated circuit, comprising: a Proportional To Absolute Temperature (PTAT) circuit, comprising two series-connected n-type MOS transistors configured to receive a current source output and to provide a first voltage (for example, of the type known to provide a PTAT signal); a voltage generator circuit, comprising a p-type MOS transistor configured to provide a second voltage; a reference voltage generation circuit, configured to generate a reference voltage based on the first voltage and the second voltage; and an output circuit, configured to generate at least one thermal output signal based on the reference voltage together with the first voltage and/or the second voltage.

According to a (corresponding) further aspect, there may be considered a method of operating a thermal sensor on an integrated circuit. The method comprises: obtaining a first voltage using two series-connected n-type MOS transistors receiving a current source output; obtaining a second voltage using a p-type MOS transistor; using the first voltage and the second voltage to generate a reference voltage; and generating at least one thermal output signal based on the reference voltage together with the first voltage and/or the second voltage.

These thermal sensor and method aspects, which may be combined with any other aspect disclosed herein, have further optional features (which may also be applied to other aspects). These will be discussed further below after consideration of implementation details according to specific embodiments.

Figure 3:
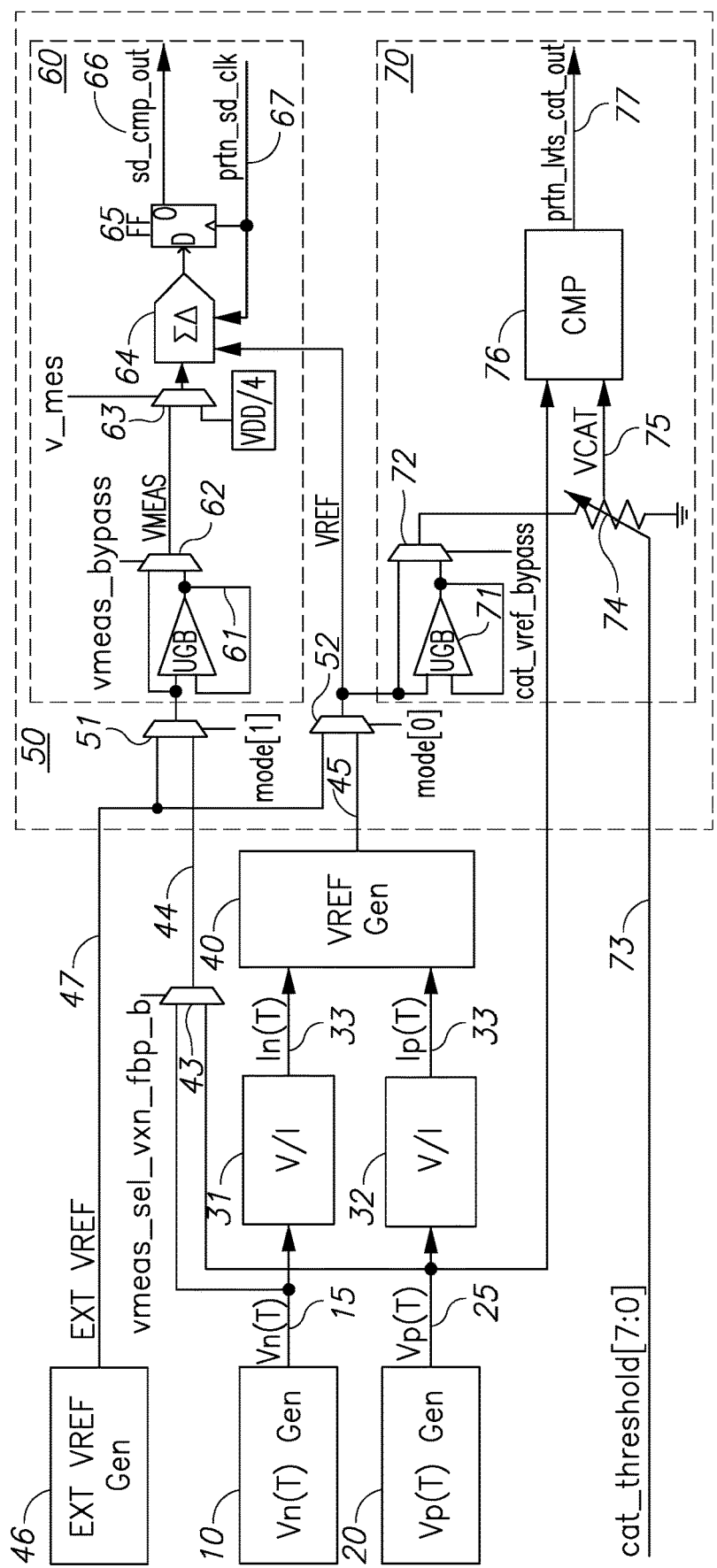
FIG. 3 depicts a schematic block diagram of a local voltage temperature sensor arrangement.

Reference is next made to FIG. 3, which depicts a schematic block diagram of a thermal sensor (also termed here Local Voltage Temperature Sensor, "LVTS") in accordance with the disclosure. The sensor comprises: a NMOS PTAT circuit 10 generating a first temperature-dependent voltage 15; a PMOS circuit 20 generating a second temperature-dependent voltage 25; a first voltage-to-current (V/I) circuit 31 generating a first (PTAT) current 33 from the first temperature-dependent voltage 15; a second voltage-to-current (V/I) circuit 32 generating a second current 34 from the second temperature-dependent voltage 25; a reference voltage generation circuit 40 generating a (temperature independent) reference voltage 45 from the first (PTAT) current 33 and the second current 34; and an output signal generation circuit 50. The reference voltage generation circuit 40 beneficially sums the first (PTAT) current 33 and the second current 34 to generate the reference voltage 45 with a high Power Supply Rejection Ratio (PSRR). The output signal generation circuit 50 receives: a thermal sense voltage 44, based on either the first temperature-dependent voltage 15 or the second temperature-dependent voltage 25 (selectable using a multiplexer 43); and the reference voltage 45 as inputs. As shown, the output signal generation circuit 50 also receives an external reference voltage (EXT VREF) 47, generated by an external reference voltage generation circuit 46 (and used to calibrate the thermal sensor), and the second temperature-dependent voltage 25. The thermal sense voltage may be based on a combination of the first temperature-dependent voltage 15 and the second temperature-dependent voltage 25 in other implementations. The output signal generation circuit 50 generates a digital thermal signal output 66 (e.g., a temperature measurement) and optionally also a thermal trip signal output 77. To assist in generating the output signals, calibration data may be acquired during testing and fused inside the IC.

Exemplary implementation of the NMOS PTAT circuit 10, the PMOS circuit 20, the V/I circuits 31/32 and the reference voltage generation circuit 40 will be discussed further below. Each of the NMOS PTAT circuit 10 and the PMOS circuit 20 provides a linear output voltage over a wide range of temperatures (e.g., −40° C. to 125° C.). The first temperature-dependent voltage 15 has a positive correlation with temperature, whilst the second temperature-dependent voltage 25 has a negative correlation with temperature.

In the example configuration shown in FIG. 3, the output signal generation circuit 50 comprises: a digital thermal signal output circuit 60 generating the digital thermal signal output 66; and optionally also a catastrophic thermal trip circuit 70 generating the thermal trip signal output 77. The output signal generation circuit 50 further comprises: a first selector 51, for selecting between the external reference voltage (EXT VREF) 47 and the thermal sense voltage 44; and a second selector 52, for selecting between the external reference voltage (EXT VREF) 47 and the (temperature independent) reference voltage 45.

The digital thermal signal output circuit 60 comprises: a selectable (optional) unity gain buffer (UGB) 61; a measurement bypass selector 62; a measurement selector 63; a sigma-delta (ΣΔ) ADC 64; and a register (flip-flop) 65. UGB 61 receives the output of the first selector 51 and the output of the UGB and the output of the first selector 51 are provided as separate inputs to the measurement bypass selector 62. The output of the measurement bypass selector 62 and a VDD/4 signal are provided as separate inputs to the measurement selector 63 and the output of the measurement selector 63 is provided as a sampling input to the ADC 64. The measurement selector 63 selects between temperature measurement and voltage measurement. When the output of the measurement bypass selector 62 is provided to the ADC 64, temperature measurement is made. When the VDD/4 signal is provided to the ADC 64, the output is a voltage measurement. The VDD signal is divided (in this exemplary case, by 4) before being provided to the ADC 64 because the VDD voltage value is higher than the reference voltage (VREF).

The ADC 64 also receives the output of the second selector 52 as a reference voltage input and a clocking signal 67 as a clock input. The output of the ADC 64 is provided to the register 65, which also receives the clocking signal 67 as a clock input. The output of the register 65 is provided as the digital thermal signal output 66. The sigma-delta ADC 60 converts the value of its input voltage to a digital output, which is sampled and accumulated in the LVTS control logic (not shown), optionally into a 12 bits digital output.

The catastrophic thermal trip circuit 70 comprises: a UGB 71; a reference bypass selector 72; an adjustable resistive divider 74 set by configuration signal (cat threshold[7:0]) 73, which generates a threshold signal (VCAT) 75; and a comparator (CMP) 76, which compares the second temperature-dependent voltage 25 (although the thermal sense voltage 44 could alternatively be used) with the threshold signal 75 to generate the thermal trip signal output 77.

Optional parametric specifications for the LVTS, which are based on designs and simulations by the inventors, are detailed in the table below.

| Description | Specification |
| --- | --- |
| Voltage operation range | Min = 0.65 V, Max = 0.95 V |
| Temperature operation range | −40° C. to 125° C. |
| Area (μm$^2$) | <=2500 |
| Temperature measurement accuracy | ±0.3° C. (1 sigma) |
| ON power | <1 mA |
| Catastrophic trip accuracy | ±1.5° C. |
| Sample rate @ clock frequency | 1200-12000 samples/second |
| Frequency range: 5 MHz-50 MHz | |

It should be understood that, in practice, the LVTS may certainly be operable in broader voltage and/or temperature ranges, whether without any configuration changes or with changes that will be readily understood by those of skill in the art.

In addition, the area of the LVTS may in fact be in the range of 2000-10000 μm$^2$ (e.g., 4000 μm$^2$ or less, 6000 μm$^2$ or less, 8000 μm$^2$ or less, 10000 μm$^2$ or less), which represents substantial area savings compared to a common diode-based thermal sensor, that typically occupies an area of tens of thousands of square microns.

Regarding temperature measurement accuracy, this may in fact be in the range of ±0.8° C., or more specifically ±0.6° C., ±0.4° C., ±0.2° C., or ±0.1° C. Similarly, the catastrophic trip accuracy may in fact be in the range of ±2.0° C., or more specifically ±1.7° C., ±1.5° C., ±1.3° C., or ±1.0° C. It should be noted that there is a tradeoff between speed and accuracy; temperature measurement (e.g., using digital thermal signal output circuit 60) may be slower (as it uses an ADC) but more accurate, whereas catastrophic trip may be faster (as it lacks an ADC, so that reaction to catastrophic temperature can be quicker) but less accurate.

As to the sampling rate of the LVTS, the listed frequency ranges of 5 MHz-50 MHz are merely given as examples of frequencies that, on one hand, are much slower relative to the IC's clock frequency (which might be in the GHz range) and are thus less power-consuming, and on the other hand fast enough to provide an adequate number of samples (temperature measurements) per second in most common scenarios. IC manufacturers may of course elect to operate an LVTS at a frequency exceeding the range listed in the table (e.g., at a frequency in the range of 1 MHz to 1 GHz), to suit other scenarios or needs.

Specific implementations will now be discussed, but further reference to the generalized sense will be made below.

PTAT Circuit

Figure 4B:
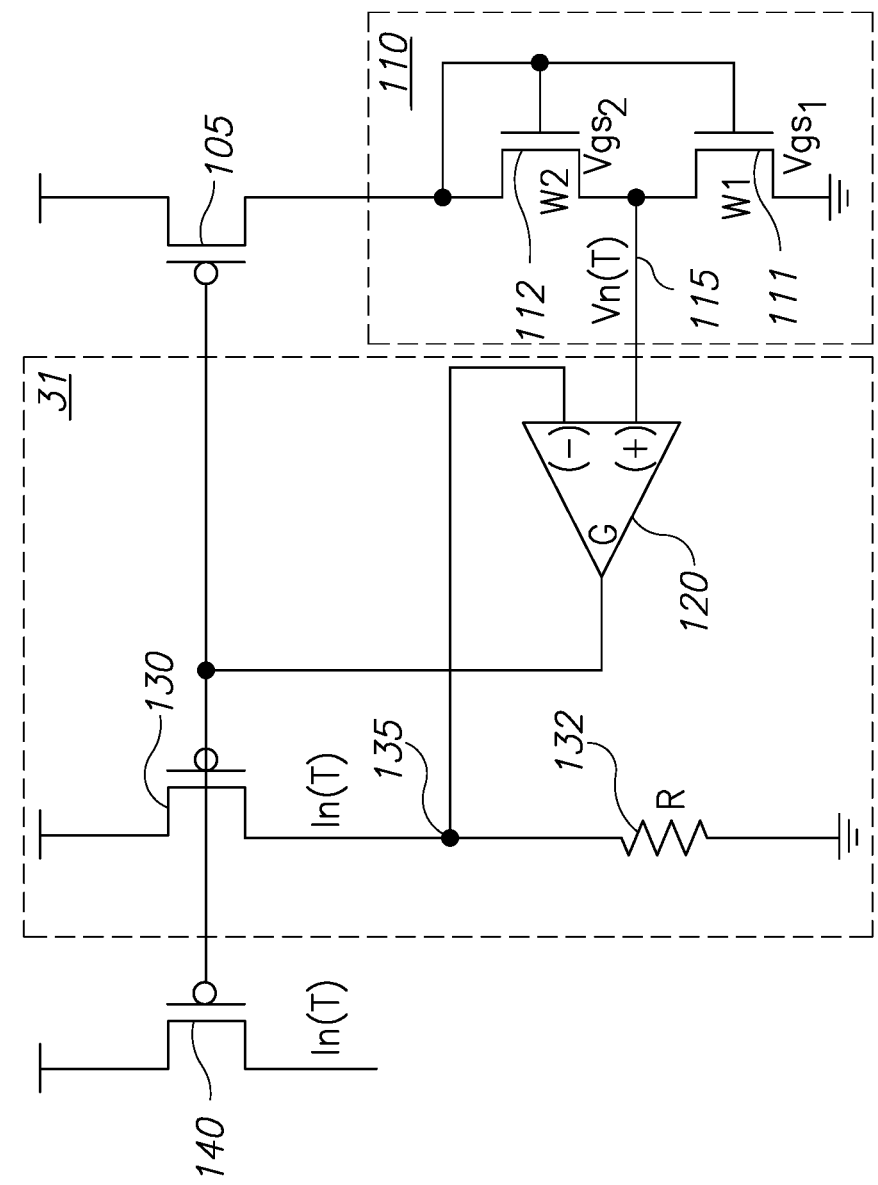
FIG. 4B illustrates a circuit diagram, using the circuit of FIG. 4A, for generating a PTAT current within an IC.
Figure 4A:
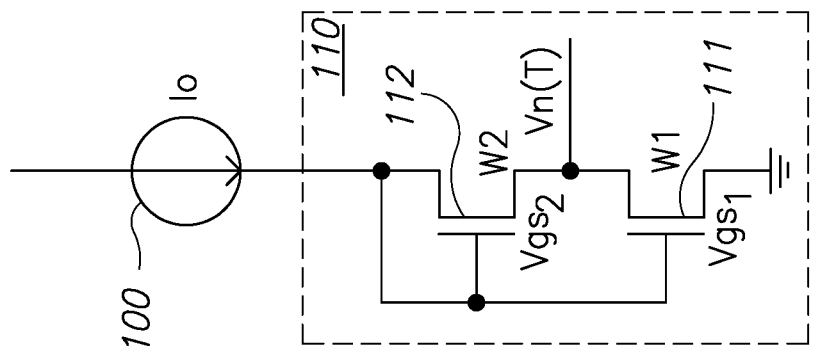
FIG. 4A shows a circuit for obtaining a Proportional-to-Absolute-Temperature (PTAT) voltage.

Reference is now made to FIG. 4A, which shows a circuit for obtaining a PTAT voltage. This circuit is known, for example from "A low-voltage CMOS bandgap reference.", Vittoz et al., IEEE Journal of Solid-State Circuits vol. 14.3 (1979) pp. 573-579. This may be used as part of a LVTS, for example as shown in FIG. 3, as will be discussed further below. It comprises: a current source (Io) 100; and a MOS transistor arrangement 110. The MOS transistor arrangement 110 comprises two series connected n-type MOS (NMOS) transistors with a common gate connection. One end of the transistor arrangement 110 (in the configuration shown, this is the source of a first transistor 111 of size W1) is connected to ground, and the other end of the transistor arrangement 110 (in the configuration shown, this is the drain of a second transistor 112 of size W2) is connected to the current source 100 as well as to the common gate connection.

It is assumed that the MOS transistors 111, 112 are operating in sub-threshold mode. Then, a temperature-dependent output voltage, (shown as Vn(T)) is generated and output at the intermediate point between the series-connected transistors (where the drain of one transistor is connected to the source of the other transistor). The temperature-dependent output voltage Vn(T) is given by the following expressions, where kT/q indicates the Thermal Voltage ($V_T$) of the diode (PN junction), according to the Shockley diode equation. Thus, the temperature-dependent output voltage Vn(T) has a positive correlation with temperature and is not dependent on the power supply voltage.

$$Vn(T) = Vgs_1 - Vgs_2 = \Delta Vgs_n$$

$$\Delta Vgs_n = \ln\left(\frac{W_2}{W_1}\right) \cdot \frac{k \cdot T}{q},$$

where $Vgs_1$ is the gate to source voltage of transistor 111, $Vgs_2$ is the gate to source voltage of transistor 112, k is the Boltzmann constant, T is temperature, and q is electron charge.

A similar arrangement can be implemented using p-type MOS (PMOS) transistors. In that case, the end of the transistor arrangement that is connected to the common gate connection is the same end as connected to ground, rather than the end connected to the current source. However, this configuration of PTAT circuit has an output that may be dependent on the power supply voltage and is therefore not generally used. The output voltage of a circuit based on PMOS transistors has a negative correlation with temperature.

Reference is next made to FIG. 4B, which illustrates a circuit diagram, using the circuit of FIG. 4A, for generating a PTAT current within an IC. As above, this circuit may be used as part of a LVTS, for example as shown in FIG. 3, as will be discussed further below. The NMOS transistor arrangement 110 of FIG. 4A is clearly shown, which generates a temperature-dependent output voltage (Vn(T)) 115. The current source is provided by a PMOS transistor 105 connected to the power supply voltage, $V_{DDCORE}$. Also shown in this arrangement is a voltage-to-current (V/I) circuit 31. This comprises: a differential amplifier 120; a V/I circuit PMOS transistor 130; and a V/I circuit resistor 132. The gate of the V/I circuit PMOS transistor 130 is connected to the gate of the current source PMOS transistor 105. The source of the V/I circuit PMOS transistor 130 is connected to the power supply voltage and the drain is connected to one end of the resistor 132 at a common point 135. The other end of the resistor 132 is connected to ground. The positive input of the differential amplifier 120 is connected to the PTAT output voltage (Vn(T)) 115 and the negative input of the differential amplifier 120 is connected to the common point 135.

The V/I circuit 31 therefore produces a PTAT current, In(T). This flows from the drain of the V/I circuit PMOS transistor 130, through the common point 135 and to the resistor 132. Also shown is a further PMOS transistor 140, to be discussed further below.

Extending the PTAT Voltage

Figure 5:
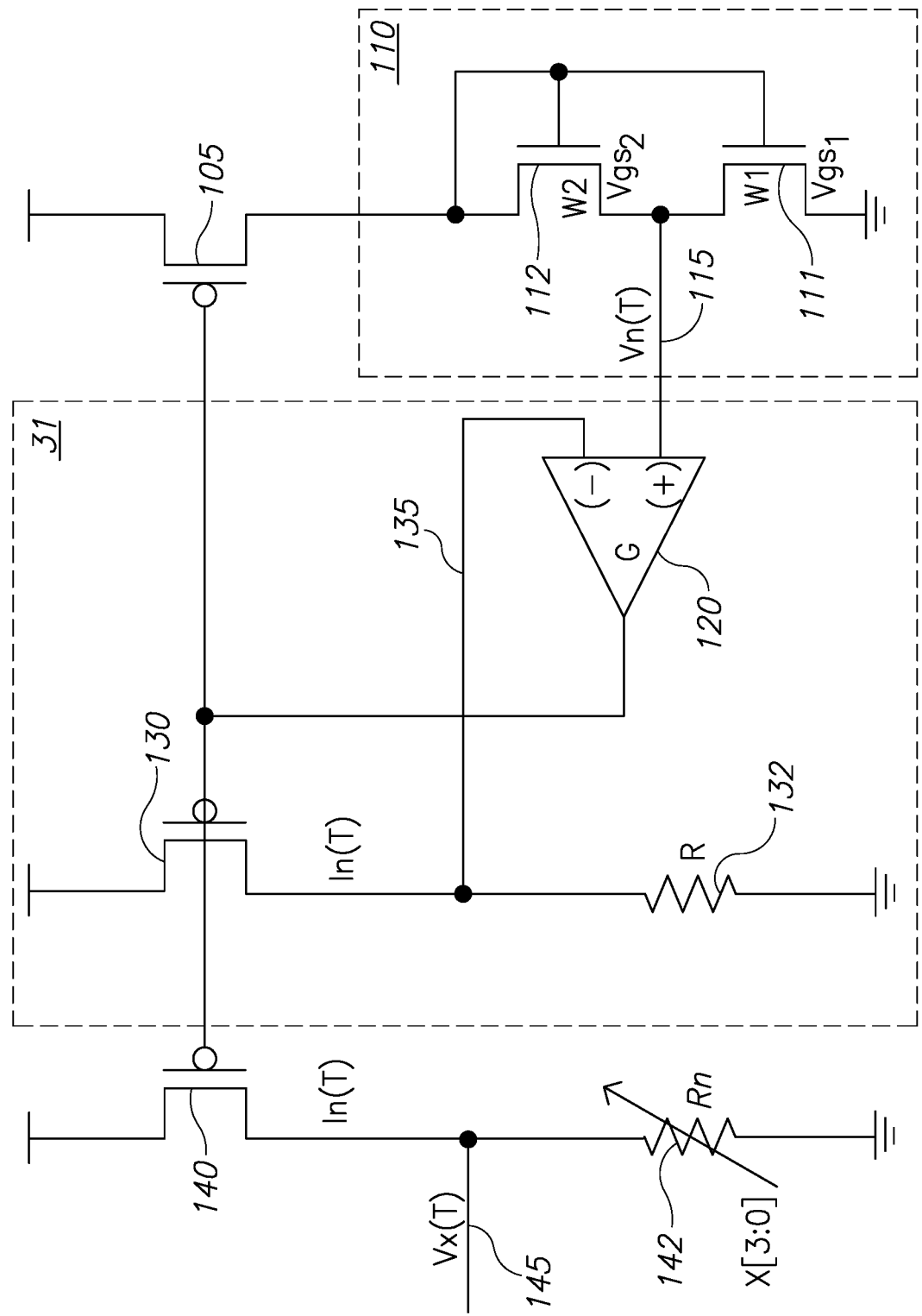
FIG. 5 shows a circuit diagram, based on the circuit of FIG. 4B, illustrating providing a further voltage based on the PTAT voltage.

Reference is made to FIG. 5, which shows a circuit diagram, based on the circuit of FIG. 4B, illustrating providing a further voltage based on the PTAT voltage. This extends the circuit of FIG. 4B and where the same features are shown, identical reference numerals have been used. This circuit may also be used as part of the LVTS, although this is not shown in the more detailed circuit diagrams below. However, it will be understood that the circuit can be used in addition to (or as an alternative to) implementations described herein.

Further PMOS transistor 140 has a source connected to the power supply voltage and a gate connected to the gate of the current source PMOS transistor 105 and the gate of the V/I circuit PMOS transistor 130. Thus, the current flowing from the drain of the further PMOS transistor 140 has the same behavior against temperature as the PTAT current, In(T), flowing from the drain of the V/I circuit PMOS transistor 130. However, the current flowing from the drain of the further PMOS transistor 140 may have a different amplitude, dependent on the size ratio (r) of further PMOS transistor 140 to PMOS transistor 130. Typically, the size ratio is greater than 1, to change the level and the span of Vx(T) compared with Vn(T).

The drain of the further PMOS transistor 140 is connected to an adjustable resistor (Rn) 142, controlled by a digital configuration input, X[3:0] (of 4 bits, for example). The voltage ("extension voltage") 145 at the drain of the further PMOS transistor 140, Vx(T), is also a PTAT voltage and has a scale controlled by the size ratio (r) and adjustment of the resistor (Rn) 142, since Vx(T)=r*Rn/R·(Vn(T)).

This voltage, which may be termed an extension voltage, can be used for providing an output from the sensor. This will be discussed further below.

Generating a Reference Voltage

In order to provide an output from the sensor, it is highly desirable to have a temperature-invariant reference voltage. This can be provided by the use of two temperature dependent circuits, one using NMOS transistors (specifically the PTAT circuit discussed above) and the other using PMOS transistors. Although the PMOS temperature dependent circuit could be designed analogously to the NMOS temperature dependent circuit, a different design is proposed, as discussed below, with specific advantages.

Figure 6:
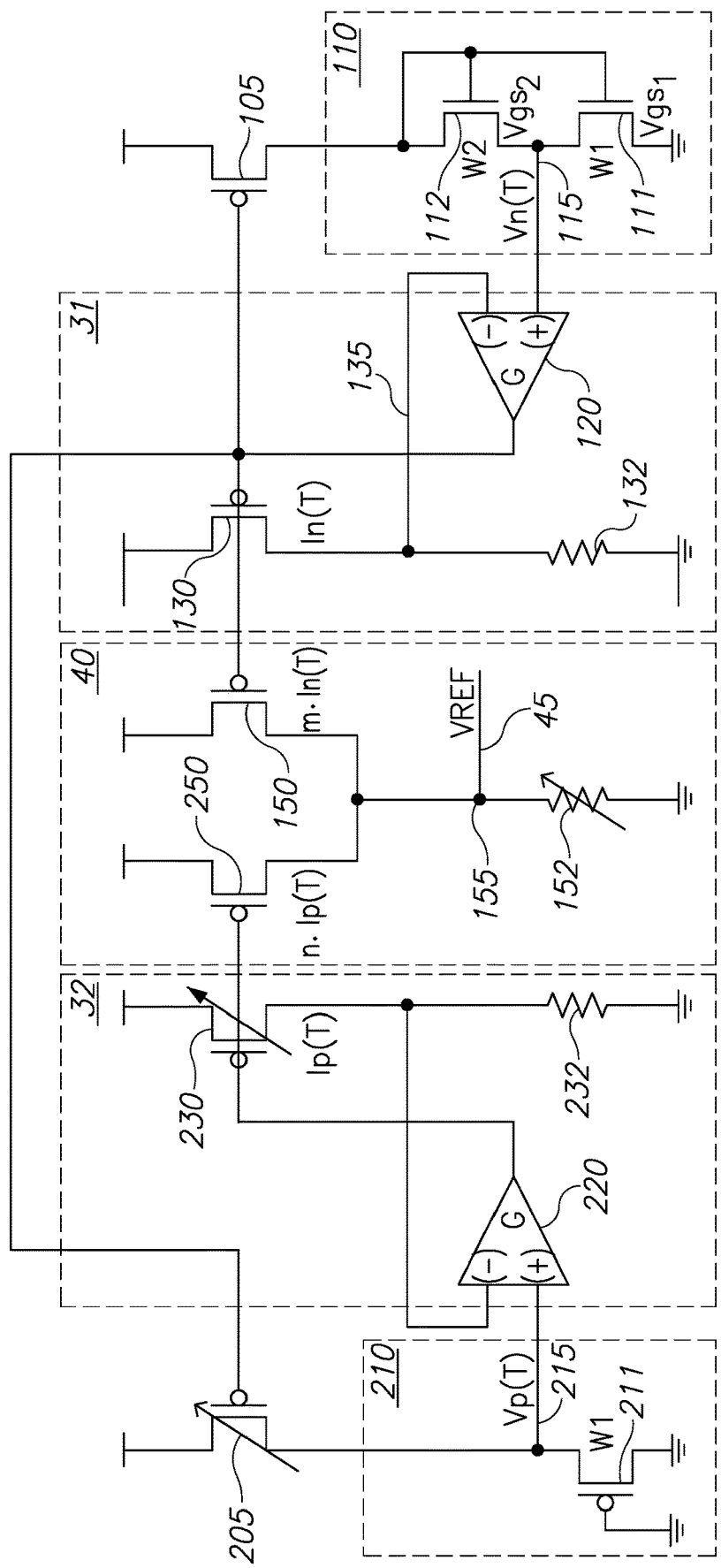
FIG. 6 depicts a circuit diagram for generating a reference voltage that may be independent of temperature, in accordance with the block diagram of FIG. 3.

Referring now to FIG. 6, there is depicted a circuit diagram for generating a reference voltage that may be independent of temperature, in accordance with the block diagram of FIG. 3. It also uses the circuit of FIG. 4B and where the same features are shown as in earlier drawings, identical reference numerals have been used.

A PMOS transistor arrangement 210, as discussed above, is shown, with current supplied by a current source PMOS transistor 205, which is driven by a current generated by the NMOS transistor structure, as will be discussed below. The PMOS transistor arrangement 210 comprises a PMOS transistor 211 of size W1 and provides a temperature-dependent output voltage Vp(T) 215. The current density of the PMOS transistor 211 is determined by its size such that the transistor will operate at the sub-threshold region. At the sub-threshold operation, the device current can be described by the following equations, demonstrating a direct, negative correlation of source-gate voltage ($V_{sg}$) with temperature and in which $V_{SD}$ represents source-drain voltage, $V_{th}$ represents the device (transistor) threshold voltage, ID represents the drain current and $I_O(T)$ represents the temperature-dependent source current.

$$I_D = I_0 \cdot \exp\left(\frac{V_{sg} + V_{th}}{V_T}\right) \cdot \left(1 - \exp\left(-\frac{V_{SD}}{V_T}\right)\right) \approx I_0 \cdot \exp\left(\frac{V_{sg} + V_{th}}{V_T}\right)$$

$$\ln\left(\frac{I_D}{I_0(T)}\right) \cdot V_T = (V_{sg} + V_{th})$$

$$V_{sg} = \ln\left(\frac{I_D}{I_0(T)}\right) \cdot \frac{K}{q} \cdot T - V_{th}(T)$$

$$\text{for: } V_{th}(T) = a \cdot \frac{K}{q} \cdot T$$

-continued $$V_{sg} = \ln\left(\frac{I_D}{I_0(T)}\right) \cdot \frac{K}{q} \cdot T - a \cdot \frac{K}{q} \cdot T$$

$$I_D = \ln\left(\frac{W_2}{W_1}\right) \cdot \frac{1}{R} \cdot \frac{K \cdot T}{q} \text{(generated by the NMOS structure)}$$

$$V_{sg} = \ln\left(\frac{1}{I_0(T)} \cdot \ln\left(\frac{W_2}{W_1}\right) \cdot \frac{1}{R} \cdot \frac{K \cdot T}{q}\right) \cdot \frac{K}{q} \cdot T - a \cdot \frac{K}{q} \cdot T$$

$$I_0(T) \propto b \cdot \left(\frac{K}{q} \cdot T\right)^2$$

$$V_{sg} = \ln\left(b \cdot \left(\frac{q}{K \cdot T}\right)^2 \cdot \ln\left(\frac{W_2}{W_1}\right) \cdot \frac{1}{R} \cdot \frac{K \cdot T}{q}\right) \cdot \frac{K}{q} \cdot T - a \cdot \frac{K}{q} \cdot T$$

$$V_{sg} = \ln\left(b \cdot \ln\left(\frac{W_2}{W_1}\right) \cdot \frac{1}{R} \cdot \frac{q}{K \cdot T}\right) \cdot \frac{K}{q} \cdot T - a \cdot \frac{K}{q} \cdot T$$

$$V_{sg} = \left(\ln\left(\frac{A}{T_0}\right) + \left(1 - \frac{T}{T_0}\right)\right) \frac{K}{q} \cdot T - a \cdot \frac{K}{q} \cdot T$$

$$V_{sg} = \ln\left(\frac{A}{T_0}\right) \cdot \frac{K}{q} \cdot T - a \cdot \frac{K}{q} \cdot T$$

$$A = b \cdot \ln\left(\frac{W_2}{W_1}\right) \cdot \frac{1}{R} \cdot \frac{q}{K}$$

A is designed such that:

$$V_{sg} \approx -a \cdot \frac{K}{q} \cdot T$$

Thus, the output voltage 215 of the PMOS transistor arrangement 210 is inversely proportional to temperature, but may not be as linear or as voltage-supply independent as the temperature-dependent output voltage (Vn(T)) 115 of the NMOS transistor arrangement 110.

The current source PMOS transistor 205 has a source connected to the power supply voltage and a drain connected to the PMOS transistor arrangement 210 (specifically, the source of the PMOS transistor 211), thereby providing a drive current. The gate of the current source PMOS transistor 205 is connected to the gate of the gate of the current source PMOS transistor 105, so that the current supplied to the PMOS transistor arrangement 210 is based on the current supplied to the NMOS transistor arrangement 110. The currents could be the same if the sizes of the current source PMOS transistor 105 and the current source PMOS transistor 205 are the same. Advantageously, the sizing of the current source PMOS transistor 205 is adjustable or trimmable, to enable the current to be configured as appropriate.

A second voltage-to-current (V/I) circuit 32 is also shown, which is very similar to V/I circuit 31 discussed above. V/I circuit 32 comprises: differential amplifier 220; V/I circuit PMOS transistor 230; and V/I circuit resistor 232. The gate of the V/I circuit PMOS transistor 230 is connected to the gate of the current source PMOS transistor 205. The source of the V/I circuit PMOS transistor 230 is connected to the power supply voltage and the drain is connected to one end of the resistor 232. The other end of the resistor 232 is connected to ground. The positive input of the differential amplifier 220 is connected to the temperature dependent output voltage (Vp(T)) 215 and the negative input of the differential amplifier 220 is connected to the drain of the V/I circuit PMOS transistor 230.

The reference voltage generation circuit 40 comprises: a first PMOS transistor 150; a second PMOS transistor 250; and a common resistor 152. The source of the first PMOS transistor 150 and the second PMOS transistor 250 are both connected to the power supply voltage and their drains are both connected to a common point 155. One end of the common resistor 152 is also connected to the common point 155. The other end of the common resistor 152 is connected to ground.

The gate of the first PMOS transistor 150 is connected to the gate of the current source PMOS transistor 105 and the gate of the V/I circuit PMOS transistor 130. The first PMOS transistor 150 is sized such that the current flowing from its drain is a first multiple (m) of the PTAT current In(T) from the NMOS transistor arrangement 110. The gate of the second PMOS transistor 250 is connected to the gate of the current source PMOS transistor 205 and the gate of the V/I circuit PMOS transistor 230. The second PMOS transistor 250 is sized such that the current flowing from its drain is a second multiple (n) of the PTAT current Ip(T) from the PMOS transistor arrangement 210. Thus, the current flowing through the common point 155 is the sum of the currents from the drains of the first PMOS transistor 150 and the second PMOS transistor 250. The flow of this current through common resistor 152 causes a voltage at the common point 155. This voltage is the reference voltage 45.

Catastrophic Trip Signal Generator

Figure 7:
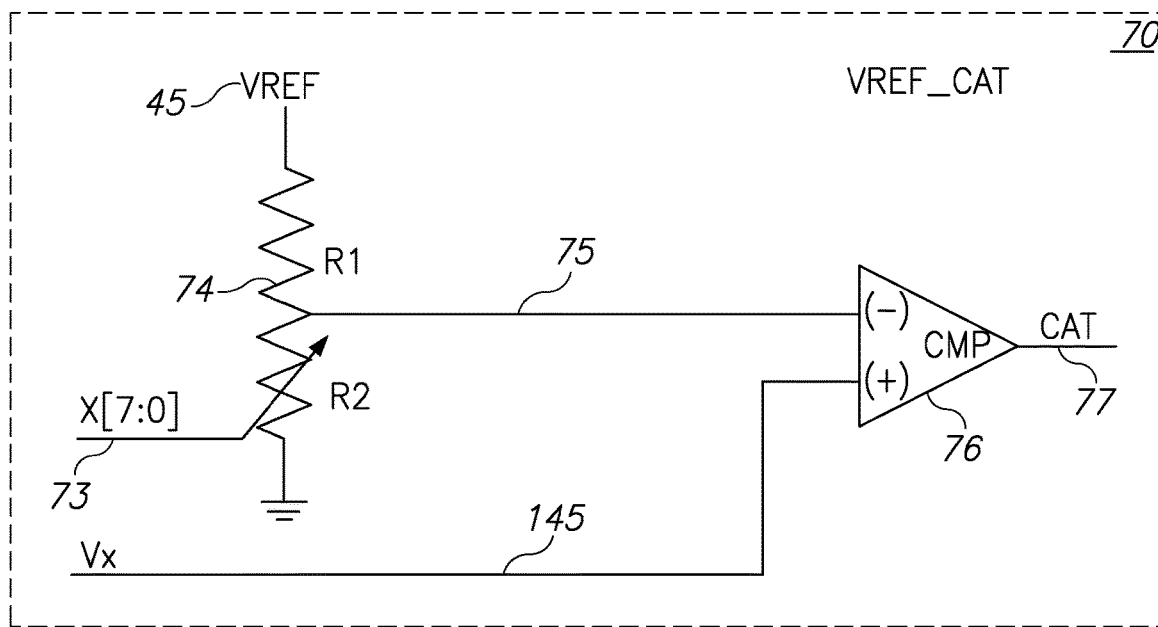
FIG. 7 illustrates a schematic circuit for generating a thermal trip signal, in accordance with the block diagram of FIG. 3.

Reference is now made to FIG. 7, which illustrates a schematic circuit 70 for generating a thermal trip signal 75, in accordance with the block diagram of FIG. 3. This uses the extension voltage Vx(T) 145 and the reference voltage 45 as inputs. A further input is a trip calibration signal 71, as will be discussed below.

The circuit comprises: a resistive divider 72; and a comparator 74. The resistive divider is used to divide the reference voltage 45 and is configured by the 8-bit trip calibration signal X[7:0] 71. This produces a threshold voltage 73.

The threshold voltage 73 provides a first (positive) input to the comparator 74 and the extension voltage Vx(T) 145 provides a second (negative) input to the comparator 74. The output of the comparator provides the thermal trip signal CAT 75. The thermal trip signal 75 is therefore a binary signal. It can be used for additional control of part or all of the IC. For example, in response to the thermal trip signal 75 indicating a catastrophic temperature (namely, a temperature above a predefined threshold), one or more operating characteristics (for instance, operational frequency, voltage, etc.) of a part or all of the IC can be changed (for example, lowered) or a part or all of the IC can be shut down to prevent damage to that part or the entire IC due to overheating. The implementation of such responses to catastrophic trip signals already exists in many conventional ICs, so it will not be discussed in detail herein.

Digital Thermal Signal Calibration

Figure 8:
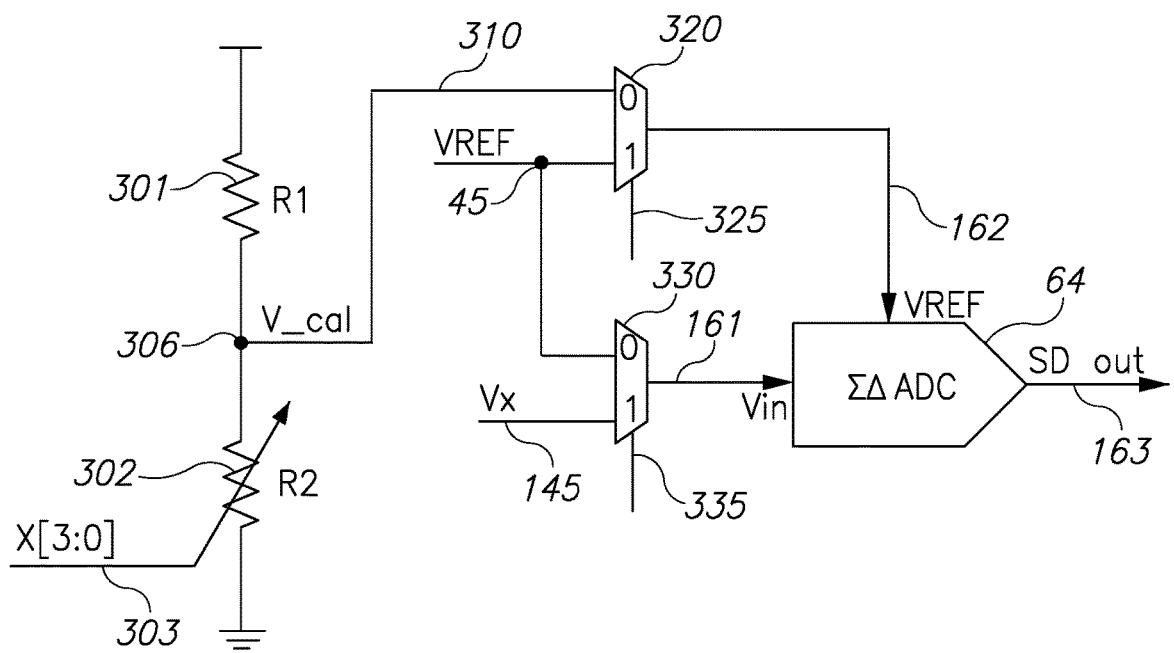
FIG. 8 schematically shows ancillary circuitry for calibration of a generated reference voltage.

Reference is next made to FIG. 8, which schematically shows ancillary circuitry for calibration of the digital thermal signal. Although such circuitry is not shown schematically in FIG. 3, it will be understood that this circuit or the additional features disclosed in the circuit can be used in addition to (for instance, combined with) or as an alternative to implementations disclosed elsewhere herein. The sigma-delta ADC 64 has a signal input 161 and a reference input 162. It uses the voltage at the reference input 162 to generate a digital thermal signal 65 that corresponds with the voltage at the signal input 161.

As part of the ancillary circuitry, a calibration voltage 310 is generated. This is achieved using a resistive divider that comprises a first resistor 301 and a second, adjustable resistor 302. The first resistor 301 is connected to the power supply voltage, $V_{DDCORE}$. The adjustable resistor 302 is set by a configuration signal 303. In this embodiment, the configuration signal 303 is, for example, a 4-bit signal, X[3:0]. The calibration voltage V_cal 310 is output at the common point 306 between the first resistor 301 and the second resistor 302. In a practical implementation, the configuration signal 303 can be set to maintain V_cal at approximately 300 mV for $V_{DDCORE}$ between 750 mV and 950 mV.

As shown in FIG. 8, a selector arrangement controls the inputs provided to the signal input 161 and the reference input 162 of the ADC 64. This comprises two selectors: a first selector 320 having two inputs (0, 1), with the output controlled by a first selection signal 325; and a second selector 330 having two inputs (0, 1), with the output controlled by a second selection signal 335. The first selection signal 325 and the second selection signal 335 can be considered as a 2-bit mode input: Mode[1:0]. The calibration voltage 310 is connected to the 0 port of the first selector 320, the reference voltage 45 is connected to the 1 port of the first selector 320 and to the 0 port of the second selector 330. The extension voltage Vx(T) 145 is connected to the 1 port of the second selector 330.

Under normal operation, the first selection signal 325 is configured to select the 1 port of the first selector 320 and the second selection signal 335 is configured to select the 1 port of the second selector 330 (Mode[1:0]=[1, 1]). As a result, the sigma-delta ADC 64 receives the extension voltage Vx(T) 145 at the signal input 161 and the reference voltage 45 at the reference input 162. The ADC 64 therefore uses the reference voltage 45 to generate a digital thermal signal 65 that corresponds with the extension voltage Vx(T) 145.

Three different options are used during calibration. A first calibration mode is when Mode[1:0]=[0,0], a second calibration mode is when Mode[1:0]=[0,1] and a third calibration mode (corresponding with normal operation mode) is when Mode[1:0]=[1,1]. The option of Mode[1:0]=[1,0] is not used. The skilled person will appreciate ways to calibrate the ADC using these modes.

Figure 9:
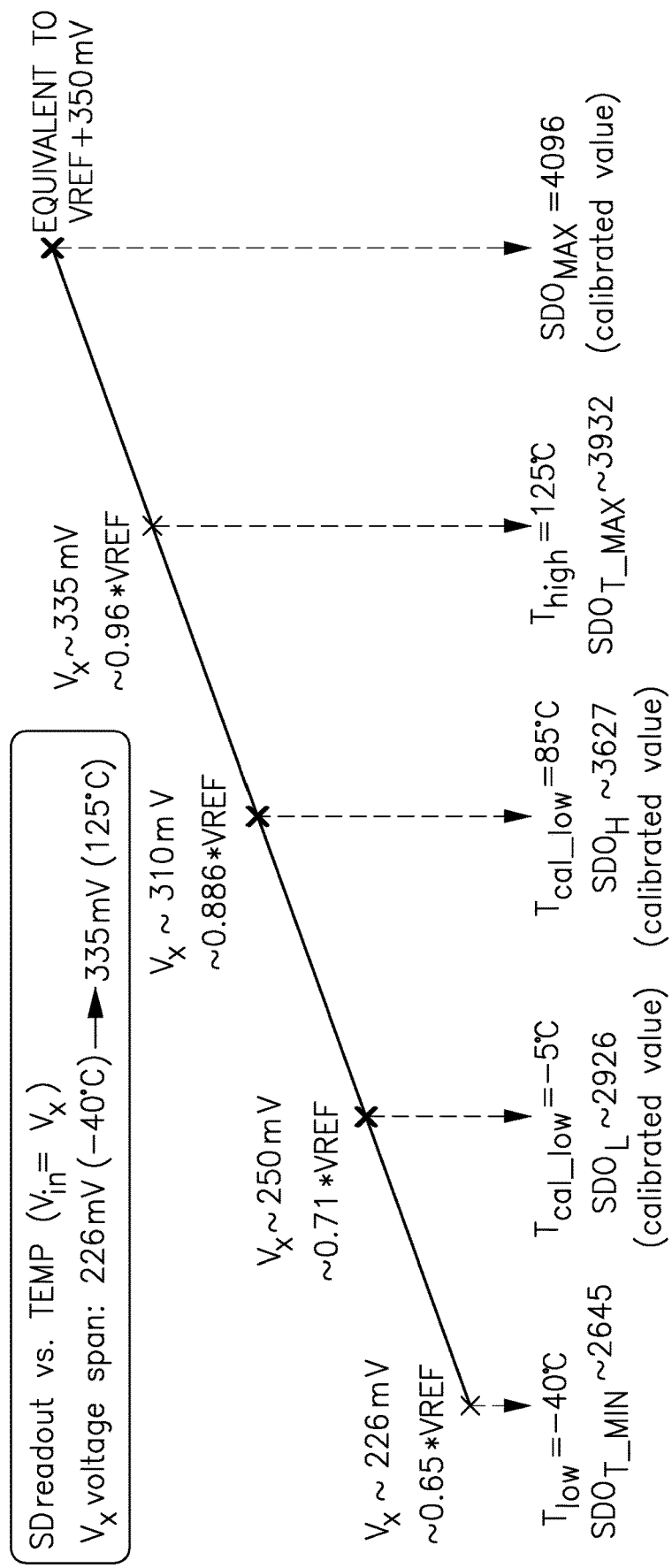
FIG. 9 illustrates an exemplary plot of PTAT voltage against temperature, after calibration.

Reference is now made to FIG. 9, which illustrates an exemplary plot of PTAT voltage (specifically Vx(T)) against temperature, after calibration (for an exemplary reference voltage of 350 mV). The 12-bit ADC output (SDO) providing the digital thermal signal 65 is calibrated such that, when Vx(T) equals the reference voltage, it is at its maximum value (4096). A series of further calibration values are taken at other temperatures (e.g. $T_{cal\_low}$, $T_{cal\_high}$) to calibrate the digital thermal signal within a linear range. The ADC output at the minimum sensor operation temperature ($T_{low}$) and maximum sensor operation temperature ($T_{high}$) are also read to confirm linearity.

Returning to the general sense discussed above, various optional and/or implementation features may be considered according to one or more of the aspects. These will now be discussed in more detail.

For example, the reference voltage generation circuit may comprise a first voltage-to-current circuit, configured to convert the first voltage to a first current. In addition, it may comprise a second voltage-to-current circuit, configured to convert the second voltage to a second current. Then, the reference voltage generation circuit may be configured to generate the reference voltage based on a combination of the first current and the second current. Combining currents may be achieved by directing the currents to a common node, such that the currents are added.

Advantageously, each of the first and second voltage-to-current circuits comprises: an amplifier circuit (which may be a buffer or operational amplifier), configured to receive an input voltage at a first (positive) input and provide an output voltage; and a source follower circuit, comprising a MOS transistor having: a drain coupled to a power supply voltage, a gate configured to receive the output voltage from the amplifier circuit, and a source configured to provide a source voltage, the source being connected to ground via a resistor. The amplifier circuit is configured to receive the source voltage at a second (negative) input.

The reference voltage generation circuit further comprises: a first combiner transistor, having: a drain coupled to the power supply voltage, a gate coupled to the gate of the MOS transistor of the first voltage-to-current circuit, and a source coupled to a common point; a second combiner transistor, having: a drain coupled to the power supply voltage, a gate coupled to the gate of the MOS transistor of the second voltage-to-current circuit, and a source coupled to the common point; and a common resistor, connecting the common point to ground, the reference voltage being output at the common point.

This may alternatively, optionally be understood as the first voltage and the second voltage being used to generate a reference voltage by: converting the first voltage to a first current using a first MOS transistor arrangement; converting the second voltage to a second current using a second MOS transistor arrangement; and combining the first current and the second current, the reference voltage being generated by the combined first and second current flowing through a resistance. Then, the reference voltage may be calibrated by configuring one or more of: the first MOS transistor arrangement; the second MOS transistor arrangement; and the resistance.

The reference voltage can therefore be calibrated or tuned by sizing of the first and/or second combiner transistors and/or by selection or configuration of the common resistor. Beneficially, a width of the first combiner transistor is different from a width of the second combiner transistor. This may result in tuning of the reference voltage.

In implementations, the PTAT circuit further comprises a first p-type current source transistor having: a source connected to a power supply voltage, a gate coupled to the gate of the MOS transistor of the first voltage-to-current circuit, and a drain configured to provide the current source output to the series-connected n-type MOS transistors (NMOS transistor arrangement). The first p-type current source transistor may thereby provide a current to the series-connected n-type MOS transistors of the PTAT circuit.

In implementations, the voltage generator circuit further comprises a second p-type current source transistor, having: a source connected to a power supply voltage and a drain configured to provide the current source output to the p-type MOS transistor. In embodiments, a gate of the second p-type current source transistor is coupled to the gate of the first p-type current source transistor and/or the gate of the MOS transistor of the first voltage-to-current circuit. In this way, the current supplied to the p-type MOS transistor of the voltage generator circuit may be based on the current supplied to the series-connected n-type MOS transistors.

Optionally, there is further provided a sensed voltage generation circuit, comprising a MOS transistor having: a drain coupled to a power supply voltage, a gate coupled to the gate of the MOS transistor of the first voltage-to-current circuit or to the gate of the MOS transistor of the second voltage-to-current circuit, and a source connected to ground via a selectable resistance, the voltage at the source being provided as an output sensed voltage. In other words, a sensed voltage may be generated by converting the first voltage or the second voltage to a sensed current using a MOS transistor arrangement, the sensed voltage being generated by the sensed current flowing through a resistance. Then, the sensed voltage may be calibrated by configuring the resistance. A respective output sensed voltage may be used instead of each of the first voltage and/or the second voltage. For example, the thermal output signal is generated based on the sensed voltage.

The series-connected n-type MOS transistors of the PTAT circuit may comprise: a first n-type MOS transistor having: a source connected to ground, and a drain connected to a common point, and a second n-type MOS transistor having: a source connected to the common point, and a drain connected to a gate of the first n-type MOS transistor and to a gate of the second n-type MOS transistor. The drain of the second n-type MOS transistor may then be further configured to receive the current source output. The first voltage is provided at the common point.

The p-type MOS transistor of the voltage generator circuit may have a drain and a gate connected to ground, and a source that is configured to receive a current source output and to provide the second voltage.

The at least one thermal output signal may comprise a thermal trip signal. Then, the output circuit may comprise a thermal trip circuit, configured to generate the thermal trip signal by comparing a threshold voltage with a sensed voltage that is based on the first voltage and/or the second voltage. The threshold voltage is advantageously generated from the reference voltage. For example, the threshold voltage may be generated by applying the reference voltage to a resistive divider, the resistive divider comprising a selectable resistance, to allow selection of the threshold voltage.

The at least one thermal output signal may comprise a digital thermal signal. Then, the output circuit may comprise an analog-to-digital convertor, configured to convert a sensed voltage based on the first voltage and/or the second voltage to the digital thermal signal. The analog-to-digital convertor beneficially uses the reference voltage to generate the digital thermal signal. In implementations, the analog-to-digital convertor comprises a sigma-delta modulator.

A calibration circuit may be additionally provided, comprising: a calibration voltage generation circuit, comprising a resistive divider, a power supply voltage being applied to the resistive divider, wherein a resistance of the resistive divider is selectable to generate a configurable calibration voltage; and a switching circuit, configured to apply selectively: in a first configuration, the reference voltage at an analog signal input of the analog-to-digital convertor, and the calibration voltage at a reference input of the analog-to-digital convertor; in a second configuration, the sensed voltage at the analog signal input of the analog-to-digital convertor, and the calibration voltage at the reference input of the analog-to-digital convertor; and in a third configuration, the sensed voltage at the analog signal input of the analog-to-digital convertor, and the reference voltage at the reference input of the analog-to-digital convertor.

In other words, the at least one thermal output signal may be generated by applying a sensed voltage based on the first voltage or the second voltage to an analog-to-digital converter to generate a digital thermal signal. The thermal output signal may be calibrated by: generating a calibration voltage, by applying a power supply voltage to a resistive divider having a selectable resistance and selecting the resistance according to the power supply voltage; providing the reference voltage at an analog signal input of the analog-to-digital convertor and the calibration voltage at the reference input of the analog-to-digital convertor, and reading the thermal output signal as a first calibration output; providing the sensed voltage at the analog signal input of the analog-to-digital convertor and the calibration voltage at the reference input of the analog-to-digital convertor, and reading the thermal output signal as a second calibration output; and determining a calibration value based on the first and second calibration outputs.

In another approach, the at least one thermal output signal may comprise a thermal trip signal. The thermal trip signal may be generated by comparing a threshold voltage with a sensed voltage that is based on the first voltage and/or the second voltage, the threshold voltage being generated by applying the reference voltage to a resistive divider having a selectable resistance. Then, the thermal trip signal may be calibrated by setting the selectable resistance.

Figure 10:
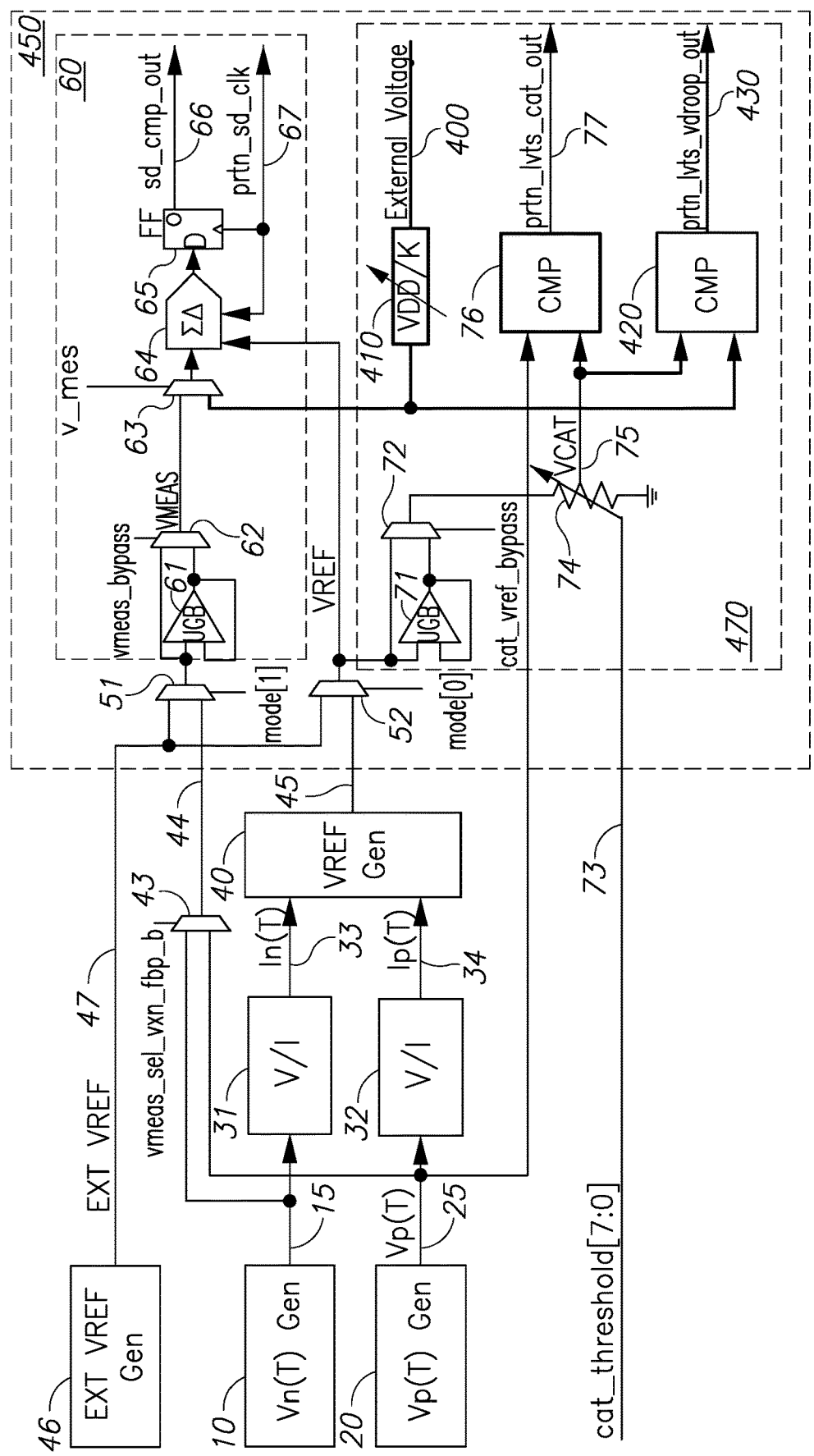
FIG. 10 depicts a schematic block diagram of a local voltage temperature sensor arrangement according to an alternative design.

Reference is now made to FIG. 10, depicting a schematic block diagram of a local voltage temperature sensor arrangement according to an alternative design in accordance with the disclosure. This is similar to FIG. 3 and where the same features are shown, identical reference numerals have been employed. Where variations on the implementation of FIG. 3 (or otherwise) have been discussed herein, these can equivalently be employed for the design of FIG. 10 (or equivalently, the changes shown in FIG. 10 compared with FIG. 3 can be applied to other designs as disclosed herein). Additionally provided is an external voltage input or port 400 with a configurable (or programmable) voltage divider 410. The output signal generation circuit 50 has been replaced by output signal generation circuit 450, having the same digital thermal signal output circuit 60, but a different catastrophic thermal trip circuit 470. The circuitry of the catastrophic thermal trip circuit 470 for generating the thermal trip signal output 77 is the same as shown in FIG. 3.

Instead of coupling the VDD/4 signal to the second input of the measurement selector 63, the input from external voltage port 400 is coupled, so as to measure any voltage signal. The configurable voltage divider 410 (VDD/K) can be used to reduce the voltage supplied to the measurement selector 63, dependent on whether it is comparable to or larger than the reference voltage (VREF). In this way, the divided voltage may be less than VREF at any value of the external voltage.

Additionally provided in the catastrophic thermal trip circuit 470 is a second comparator 420, which compares the output of the configurable voltage divider 410 and the threshold signal (VCAT) 75, providing a droop signal output 430. The second comparator 420 may thereby be used to detect a voltage droop of the voltage at the external signal input 400. It is noted that the threshold signal (VCAT) 75 provided to the second comparator 420 is generated based on the reference voltage 45 VREF generated by the thermal sensor. This voltage is therefore stable with temperature and has a high PSRR.

In general terms, the thermal sensor may further comprise an external voltage input, for receiving a signal from external the thermal sensor and providing a measurement voltage. Then, the output circuit may be configured to generate at least one voltage measurement output (possibly as an alternative to the at least one thermal output signal, for example, such that the at least one thermal output signal comprises the at least one voltage measurement output). The voltage measurement output is advantageously based on the measurement voltage and the reference voltage. The measurement voltage may be provided by applying the signal received at the external voltage input to a resistive divider. In other words, the external voltage input may comprise a resistive divider for diving the signal received at the external voltage input and providing the measurement voltage thereby.

In embodiments, the at least one voltage measurement output and/or the at least one thermal output signal may comprise a digital voltage signal. Then, the output circuit may comprise an analog-to-digital convertor, configured to convert the measurement voltage to the digital voltage signal, the analog-to-digital convertor using the reference voltage to generate the digital voltage signal. A selector may be provided to select between providing a sensed voltage based on the first voltage and/or the second voltage to the analog-to-digital convertor or providing the measurement voltage. In this way, the same analog-to-digital convertor may be used to selectively output a digital thermal signal or a digital voltage signal.

Additionally or alternatively, the at least one voltage measurement output the at least one thermal output signal may comprise a voltage droop signal. Then, the output circuit may comprise a droop detection circuit, configured to generate the voltage droop signal by comparing a threshold voltage with the measurement voltage, the threshold voltage being generated from the reference voltage. The droop detection circuit may share circuit elements (for instance, a threshold voltage generator) with the thermal trip circuit. Typically, a second comparator is provided to allow output of the voltage droop signal and the thermal trip signal at the same time. Alternatively, a selector may be provided to select between providing a sensed voltage based on the first voltage and/or the second voltage to the analog-to-digital convertor or providing the measurement voltage. Then, a single comparator may be used to selectively output a digital thermal signal or a digital voltage signal.

General Points

Throughout this disclosure, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

In the description, any numerical value should be interpreted as meaning up to a 20% deviation (namely, ±20%) from that value. Similarly, when a numerical range is described, it means up to a 20% broader range (10% over that explicit range and 10% below it).

In the description, when a physical element is described as being "for" performing a certain action (for example, "a circuit for doing X"), and similarly when a physical element is described as actively performing a certain action (for example, "the circuit does X"), it is intended that the respective physical element is configured to (also "adapted to") perform that certain.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

To clarify the references in this disclosure, it is noted that the use of nouns as common nouns, proper nouns, named nouns, and the/or like is not intended to imply that embodiments of the invention are limited to a single embodiment, and many configurations of the disclosed components can be used to describe some embodiments of the invention, while other configurations may be derived from these embodiments in different configurations.

In the interest of clarity, not all of the routine features of the implementations described herein are shown and described. It should, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Based upon the teachings of this disclosure, it is expected that one of ordinary skill in the art will be readily able to practice the present invention. The descriptions of the various embodiments provided herein are believed to provide ample insight and details of the present invention to enable one of ordinary skill to practice the invention. Moreover, the various features and embodiments of the invention described above are specifically contemplated to be used alone as well as in various combinations.

Conventional and/or contemporary circuit design and layout tools may be used to implement the invention. The specific embodiments described herein, and in particular the various thicknesses and compositions of various layers, are illustrative of exemplary embodiments, and should not be viewed as limiting the invention to such specific implementation choices. Accordingly, plural instances may be provided for components described herein as a single instance.

While circuits and physical structures are generally presumed, it is well recognized that in modern semiconductor design and fabrication, physical structures and circuits may be embodied in computer readable descriptive form suitable for use in subsequent design, test or fabrication stages as well as in resultant fabricated semiconductor integrated circuits. Accordingly, claims directed to traditional circuits or structures may, consistent with particular language thereof, read upon computer readable encodings and representations of same, whether embodied in media or combined with suitable reader facilities to allow fabrication, test, or design refinement of the corresponding circuits and/or structures. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer readable medium includes at least disk, tape, or other magnetic, optical, semiconductor (e.g., flash memory cards, ROM), or electronic medium and a network, wireline, wireless or other communications medium.

The foregoing detailed description has described only a few of the many possible implementations of the present invention. For this reason, this detailed description is intended by way of illustration, and not by way of limitations. Variations and modifications of the embodiments disclosed herein may be made based on the description set forth herein, without departing from the scope and spirit of the invention. It is only the following claims, including all equivalents, which are intended to define the scope of this invention. In particular, even though the preferred embodiments are described in the context of a specific PTAT circuit, the teachings of the present disclosure are believed advantageous for use with other types of MOS-based PTAT circuits. Other types of circuits and/or approaches for reference voltage generation from PTAT signals may be considered. For instance, the PMOS voltage generator circuit may be replaced by a PTAT circuit in some embodiments, possibly with corresponding changes to the current source transistor arrangement. Even in the specific implementations described, other types of V/I circuits and current combining circuits may be considered. The specific circuits, sizing and number of bits in signals are for illustration only. The LVTS in the disclosure is shown as being powered by the power supply core voltage, VDDCORE, but other options for this voltage are possible, including $V_{core}$, $V_{DD}$, $V_{DDq}$ or others. Advantageously, the power supply voltage used to power the LVTS may also power other functional circuitry on the IC. Moreover, the techniques described herein may also be applied to other types of circuit applications. Accordingly, other variations, modifications, additions, and improvements may fall within the scope of the invention as defined in the claims that follow.

Embodiments of the present invention may be used to fabricate, produce, and/or assemble integrated circuits and/or products based on integrated circuits.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

The present disclosure may include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The skilled person will appreciate that combinations and sub-combinations of specific features disclosed herein may also be provided, even if not explicitly described.

What is claimed is:

1. A thermal sensor for an integrated circuit, comprising:
   a Proportional To Absolute Temperature (PTAT) circuit, comprising two series-connected n-type MOS transistors configured to receive a current source output and to provide a first voltage;
   a voltage generator circuit, comprising a p-type MOS transistor configured to provide a second voltage;
   a reference voltage generation circuit, configured to generate a reference voltage based on the first voltage and the second voltage; and
   an output circuit, configured to generate at least one thermal output signal based on the reference voltage together with the first voltage and/or the second voltage.

2. The thermal sensor of claim 1, wherein the reference voltage generation circuit comprises:
   a first voltage-to-current circuit, configured to convert the first voltage to a first current; and
   a second voltage-to-current circuit, configured to convert the second voltage to a second current,
   wherein the reference voltage generation circuit is configured to generate the reference voltage based on a combination of the first current and the second current.

3. The thermal sensor of claim 2, wherein each of the first and second voltage-to-current circuits comprises:
   an amplifier circuit, configured to receive the first or second voltage, respectively, at a first input, and to provide an output voltage; and
   a MOS transistor having: a drain coupled to a power supply voltage, a gate configured to receive the output voltage from the amplifier circuit, and a source configured to provide a source voltage, the source being connected to ground via a resistor, wherein the amplifier circuit is configured to receive the source voltage at a second input.

4. The thermal sensor of claim 3, wherein the reference voltage generation circuit further comprises:
a first combiner transistor, having: a drain coupled to the power supply voltage, a gate coupled to the gate of the MOS transistor of the first voltage-to-current circuit, and a source coupled to a common point;
a second combiner transistor, having: a drain coupled to the power supply voltage, a gate coupled to the gate of the MOS transistor of the second voltage-to-current circuit, and a source coupled to the common point; and
a common resistor, connecting the common point to ground, the reference voltage being output at the common point.

5. The thermal sensor of claim 3, wherein:
the PTAT circuit further comprises a first p-type current source transistor having: a source connected to a power supply voltage, a gate coupled to the gate of the MOS transistor of the first voltage-to-current circuit, and a drain configured to provide the current source output to the series-connected n-type MOS transistors; and/or
the voltage generator circuit further comprises a second p-type current source transistor, having: a source connected to a power supply voltage, a gate coupled to the gate of the first p-type current source transistor and/or the gate of the MOS transistor of the first voltage-to-current circuit and a drain configured to provide the current source output to the p-type MOS transistor.

6. The thermal sensor of claim 3, further comprising:
an extension voltage generation circuit, comprising a MOS transistor having: a drain coupled to a power supply voltage, a gate coupled to the gate of the MOS transistor of the first voltage-to-current circuit or to the gate of the MOS transistor of the second voltage-to-current circuit, and a source connected to ground via a selectable resistance, the voltage at the source being provided as an output sensed voltage (Vx).

7. The thermal sensor of claim 1, wherein:
the series-connected n-type MOS transistors of the PTAT circuit comprise:
a first n-type MOS transistor having: a source connected to ground, and a drain connected to a common point, and
a second n-type MOS transistor having: a source connected to the common point, and a drain connected to a gate of the first n-type MOS transistor and to a gate of the second n-type MOS transistor, wherein the drain of the second n-type MOS transistor is further configured to receive the current source output, and wherein the first voltage is provided at the common point; and/or
the p-type MOS transistor of the voltage generator circuit has a drain and a gate connected to ground, and a source that is configured to receive a current source output and to provide the second voltage.

8. The thermal sensor of claim 1, wherein the at least one thermal output signal comprises a thermal trip signal and the output circuit comprises a thermal trip circuit, configured to generate the thermal trip signal by comparing a threshold voltage with a sensed voltage that is based on the first voltage and/or the second voltage, the threshold voltage being generated from the reference voltage and based on a configuration signal.

9. The thermal sensor of claim 8, further comprising a resistive divider, wherein the threshold voltage is generated by applying the reference voltage to the resistive divider, the resistive divider comprising a selectable resistance, to allow selection of the threshold voltage, wherein the resistive divider outputs the threshold voltage.

10. The thermal sensor of claim 1, wherein the at least one thermal output signal comprises a digital thermal signal and the output circuit comprises an analog-to-digital convertor, configured to convert a sensed voltage based on the first voltage and/or the second voltage to the digital thermal signal, the analog-to-digital convertor using the reference voltage to generate the digital thermal signal.

11. The thermal sensor of claim 10, wherein the analog-to-digital convertor comprises a sigma-delta modulator.

12. The thermal sensor of claim 10, further comprising a calibration circuit, comprising:
a calibration voltage generation circuit, comprising a resistive divider, a power supply voltage being applied to the resistive divider, wherein a resistance of the resistive divider is selectable to generate a configurable calibration voltage; and
a switching circuit, configured to apply selectively:
in a first configuration, the reference voltage at an analog signal input of the analog-to-digital convertor, and the calibration voltage at a reference input of the analog-to-digital convertor;
in a second configuration, the sensed voltage at the analog signal input of the analog-to-digital convertor, and the calibration voltage at the reference input of the analog-to-digital convertor; and
in a third configuration, the sensed voltage at the analog signal input of the analog-to-digital convertor, and the reference voltage at the reference input of the analog-to-digital convertor.

13. The thermal sensor of claim 1, further comprising:
an external voltage input configured to receive a voltage from external the thermal sensor and providing a measurement voltage; and
wherein the output circuit is further configured to receive the measurement voltage from the external voltage input and to generate at least one voltage measurement output, the voltage measurement output being based on the measurement voltage and the reference voltage.

* * * * *